United States Patent
Wu et al.

(10) Patent No.: US 8,239,664 B2
(45) Date of Patent: Aug. 7, 2012

(54) COMPUTER SYSTEM HAVING DUAL BIOS PROGRAM PROTECTING FUNCTION AND CONTROL METHOD THEREOF

(75) Inventors: Chao-Chung Wu, Taipei (TW); Yu-Chen Lee, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 349 days.

(21) Appl. No.: 12/575,085

(22) Filed: Oct. 7, 2009

(65) Prior Publication Data
US 2010/0100720 A1  Apr. 22, 2010

(30) Foreign Application Priority Data
Oct. 20, 2008 (TW) .............................. 97140092 A (51) Int. Cl.
*G06F 9/24* (2006.01)
*G06F 15/177* (2006.01)
(52) U.S. Cl. ............... 713/1; 713/2; 713/100; 714/100
(58) Field of Classification Search ................. 713/1, 2, 713/100; 714/100
See application file for complete search history.

(56) References Cited

U.S. PATENT DOCUMENTS

| 6,651,188 B2 * | 11/2003 | Harding et al. ............ 714/38.13 |
| 2003/0005277 A1 | 1/2003 | Harding et al. |
| 2005/0273588 A1 | 12/2005 | Ong et al. |
| 2008/0126777 A1 * | 5/2008 | Chang et al. ...................... 713/2 |
| 2009/0063834 A1 * | 3/2009 | Huang et al. ..................... 713/2 |

FOREIGN PATENT DOCUMENTS

| TW | I251771 | 3/2006 |
| TW | 200825915 | 6/2008 |
| WO | 03003212 | 1/2003 |
| WO | 2008104117 | 9/2008 |

* cited by examiner

*Primary Examiner* — Thuan Du
*Assistant Examiner* — Michael J Brown
(74) *Attorney, Agent, or Firm* — Jianq Chyun IP Office (57) ABSTRACT

A dual BIOS program protecting method is provided for protecting a first BIOS program and a second BIOS program of a computer system. Firstly, a flag is switched from a first status to a second status during the refreshing of the first BIOS program. If the first BIOS program is successfully refreshed, the flag is switched from the second status to the first status. If the flag is in the second status when the computer system is booted, a first control signal is generated and the second BIOS program enters a write protection mode according to the first control signal.

12 Claims, 6 Drawing Sheets

COMPUTER SYSTEM HAVING DUAL BIOS PROGRAM PROTECTING FUNCTION AND CONTROL METHOD THEREOF

FIELD OF THE INVENTION

The present invention relates to a computer system having dual BIOS program protecting function, and more particularly to a computer system having a dual BIOS program protecting function by automatically activating a write protection mechanism when one of the BIOS programs is erroneous. The present invention also relates to a method for controlling the computer system.

BACKGROUND OF THE INVENTION

When a computer system is booted, a central processing unit (CPU) executes a basic input/output system (BIOS) program that is stored in an external memory. An example of the external memory is a non-volatile memory. The BIOS program includes the basic firmware program codes of the hardware components of the motherboard. During the process of booting the computer system, the BIOS program is executed to perform a power on self-test (POST), perform an initiating task, record the settings of the computer system, provide a resident program library, or the like.

Figure 1:
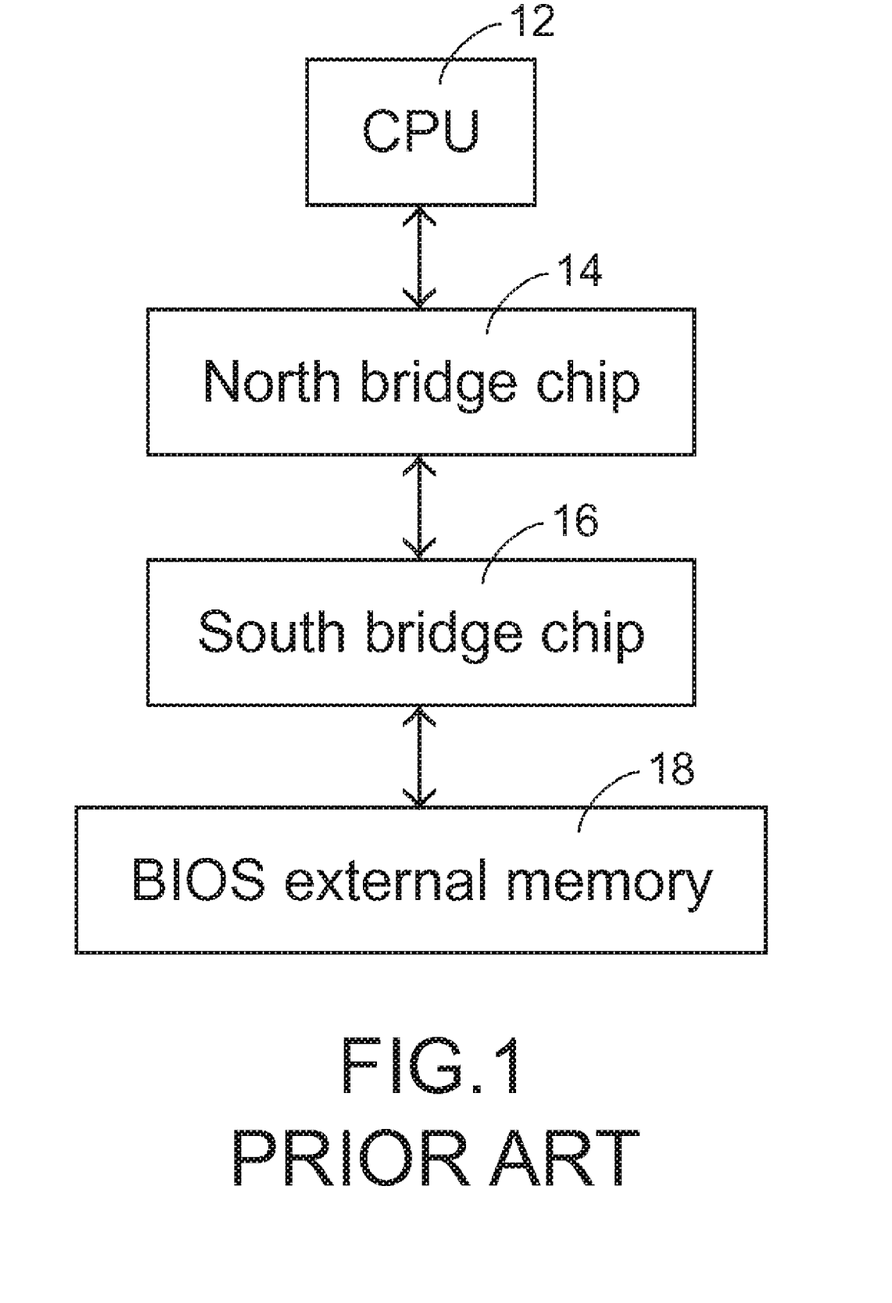
FIG. 1 is a schematic functional block diagram illustrating a computer system with a single BIOS program according to the prior art.

FIG. 1 is a schematic functional block diagram illustrating a computer system with a single BIOS program according to the prior art. As shown in FIG. 1, the computer system comprises a central processing unit (CPU) 12, a north bridge chip 14, a south bridge chip 16 and a BIOS external memory 18. The BIOS external memory 18 is used for storing a BIOS program. After an activation button of the computer system is depressed, the CPU 12 executes the BIOS program and thus an initiating task is performed. During the initiating task, the hardware information of the computer system will be detected. The hardware information includes for example CPU information, a booting sequence, a hard disk size, a working status of the chipset, a memory clock, or the like. At the same time, the BIOS program is executed to initiate some basic hardware components, including a computer memory, a video card or graphics card, and a motherboard chipset, and then perform a power on self-test (POST). After the power on self-test (POST) is implemented, the BIOS program successfully boots the computer system and thus the operating system of the computer system is activated.

In other words, the BIOS program could be deemed as a micro kernel operating system for communicating with hardware components. With rapid development of the computers, the software for use in the computer system is increasingly improved. In many situations, the motherboard manufacturer usually provides an update version of the BIOS program. By manually executing the update version of the BIOS program, the computer system will achieve better compatibility and performance in order to avoid some possible expected errors. For example, after the update version of the BIOS program is executed, the updated CPU is supported or the memory compatibility is enhanced. However, there are some possible risks during the process of refreshing the BIOS program. If the BIOS program is not successfully refreshed, the BIOS program may suffer a breakdown and thus the computer system fails to be booted. For obviating the drawbacks, the computer system needs to be returned to the depot service, which is very troublesome to the user.

Figure 2:
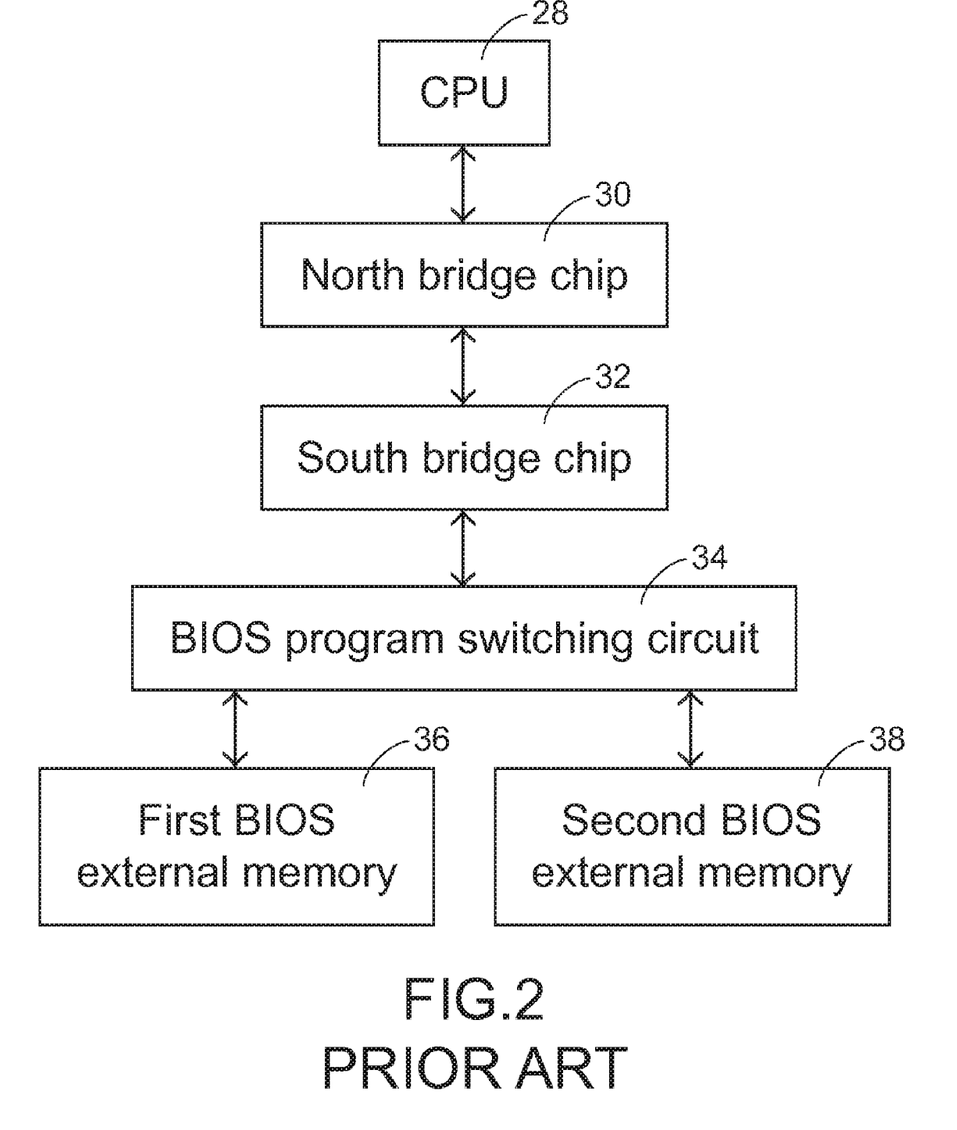
FIG. 2 is a schematic functional block diagram illustrating a computer system with two BIOS programs according to the prior art.

FIG. 2 is a schematic functional block diagram illustrating a computer system with two BIOS programs according to the prior art. As shown in FIG. 2, the computer system comprises a central processing unit (CPU) 28, a north bridge chip 30, a south bridge chip 32, a first BIOS external memory 36, a second BIOS external memory 38 and a BIOS program switching circuit 34.

A main BIOS program is stored in the first BIOS external memory 36. An auxiliary backup BIOS program is stored in the second BIOS external memory 38. In a case that the main BIOS program stored in the first BIOS external memory 36 is erroneous, a read command issued by the CPU 28 will be transmitted to the second BIOS external memory 38 through the BIOS program switching circuit 34. At the same time, the CPU 28 executes the auxiliary backup BIOS program that is stored in the second BIOS external memory 38. As such, the computer system could be successfully booted.

In other words, if the process of refreshing the main BIOS program has failure and the main BIOS program is damaged, the BIOS program switching circuit 34 will switch to the second BIOS external memory 38. As such, the auxiliary backup BIOS program is executed and the computer system is successfully booted.

In a case that the user does not realize that the main BIOS program is damaged but the process of refreshing the auxiliary backup BIOS program is performed, some problems possibly occur. For example, if the process of refreshing the auxiliary backup BIOS program also has failure, both of these two BIOS programs fail to be executed to boot the computer system. For obviating the drawbacks, the computer system needs to be returned to the depot service, which is very troublesome to the user.

SUMMARY OF THE INVENTION

In accordance with an aspect of the present invention, there is provided a dual BIOS program protecting method for protecting a first BIOS program and a second BIOS program of a computer system. Firstly, a flag is switched from a first status to a second status during the refreshing of the first BIOS program. If the first BIOS program is successfully refreshed, the flag is switched from the second status to the first status. If the flag is in the second status when the computer system is booted, a first control signal is generated and the second BIOS program enters a write protection mode according to the first control signal.

In accordance with another aspect of the present invention, there is provided a computer system having a dual BIOS program protecting function. The computer system includes a central processing unit, a chipset, an input control interface, a flag, a first BIOS external memory and a second BIOS external memory. The chipset is connected with the central processing unit. The input control interface is connected with the chipset. The flag is connected with the input control interface. The first BIOS external memory is connected with the input control interface and an input/output pin of the chipset for storing a first BIOS program. The second BIOS external memory is connected with the input control interface and the input/output pin of the chipset for storing a second BIOS program. The flag is switched from a first status to a second status during the refreshing of the first BIOS program. If the first BIOS program is successfully refreshed, the flag is switched from the second status to the first status. If the flag is in the second status when the computer system is booted, a first control signal is generated and the second BIOS program enters a write protection mode according to the first control signal.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a computer system having dual BIOS program protecting function. When a process of refreshing a first BIOS program has failure, a write protection mechanism is automatically activated, so that a second BIOS program fails to be refreshed or written. Under this circumstance, the integrity of the second BIOS program is retained in order to correct the damaged first BIOS program.

Figure 3:
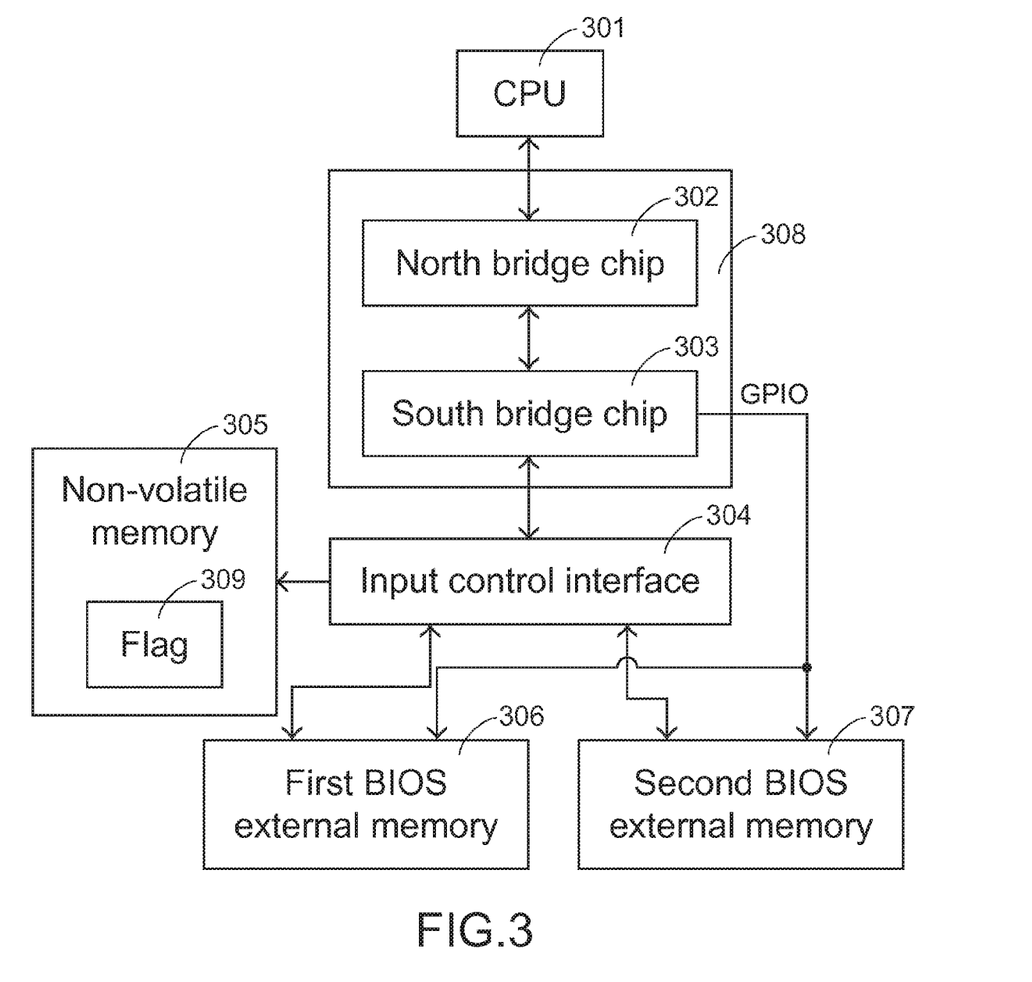
FIG. 3 is a schematic functional block diagram illustrating a computer system with a dual BIOS program according to an embodiment of the present invention.

FIG. 3 is a schematic functional block diagram illustrating a computer system with a dual BIOS program according to an embodiment of the present invention. As shown in FIG. 3, the computer system comprises a central processing unit (CPU) 301, a chipset 308 including a north bridge chip 302 and a south bridge chip 303, a first BIOS external memory 306, a second BIOS external memory 307, an input control interface 304 and a non-volatile memory (NVM) 305. A main BIOS program (also referred as BIOS1 program) is stored in the first BIOS external memory 306. An auxiliary backup BIOS program (also referred as BIOS2 program) is stored in the second BIOS external memory 307.

An example of the input control interface 304 is an embedded controller. Via the input control interface 304, the CPU 301 could execute either the BIOS1 program or the BIOS2 program. The south bridge chip 303 comprises a general purpose input/output (GPIO) pin (not shown). Through the GPIO pin, a control signal issued by the CPU 301 is transmitted to a write protection pin of the first BIOS external memory 306 or the second BIOS external memory 307. According to the control signal, the write protection mechanism of the first BIOS external memory 306 or the second BIOS external memory 307 is enabled or disabled, thereby protecting the integrity of the contents of the BIOS program.

In a case that the control signal outputted from the GPIO pin is in a high-level status (H), the first BIOS external memory 306 and the second BIOS external memory 307 are in readable and writable modes. At this moment, the BIOS1 program stored in the first BIOS external memory 306 and the BIOS2 program stored in the second BIOS external memory 307 could be read or refreshed. Whereas, in a case that the control signal outputted from the GPIO pin is in a low-level status (L), the first BIOS external memory 306 and the second BIOS external memory 307 are in read-only write protection mode. At this moment, the BIOS1 program stored in the first BIOS external memory 306 and the BIOS2 program stored in the second BIOS external memory 307 are readable but fail to be refreshed.

An example of the non-volatile memory 305 includes but is not limited to a flash memory or an electrically erasable programmable read-only memory (EEPROM). According to the level status of a flag 309 included in the non-volatile memory 305, the input control interface 304 could realize the current status of the BIOS program.

In an embodiment, if the BIOS program is normal, the flag 309 is in a low-level status (L); whereas, if the BIOS program is abnormal, the flag 309 is in a high-level status (H). For refreshing the BIOS program, the flag 309 is adjusted to be in the high-level status (H) by the input control interface 304. It is meant that the BIOS program is abnormal at this moment. After the BIOS program is successfully refreshed, the flag 309 is adjusted to be in the low-level status (L) by the input control interface 304. It is meant that the BIOS program is successfully refreshed and restored to be normal at this moment. If the BIOS program fails to be successfully refreshed, the flag 309 fails to be adjusted to be in the low-level status (L) by the input control interface 304. In other words, the flag 309 is continuously maintained in the high-level status (H). The high-level status (H) of the flag 309 indicates that the BIOS program is abnormal. The abnormal BIOS program means that a failed process of refreshing the BIOS program and the BIOS program is damaged.

Hereinafter, a dual BIOS program protecting method of a computer system will be illustrated with reference to FIGS. 4A, 4B and 4C.

Figure 4A:
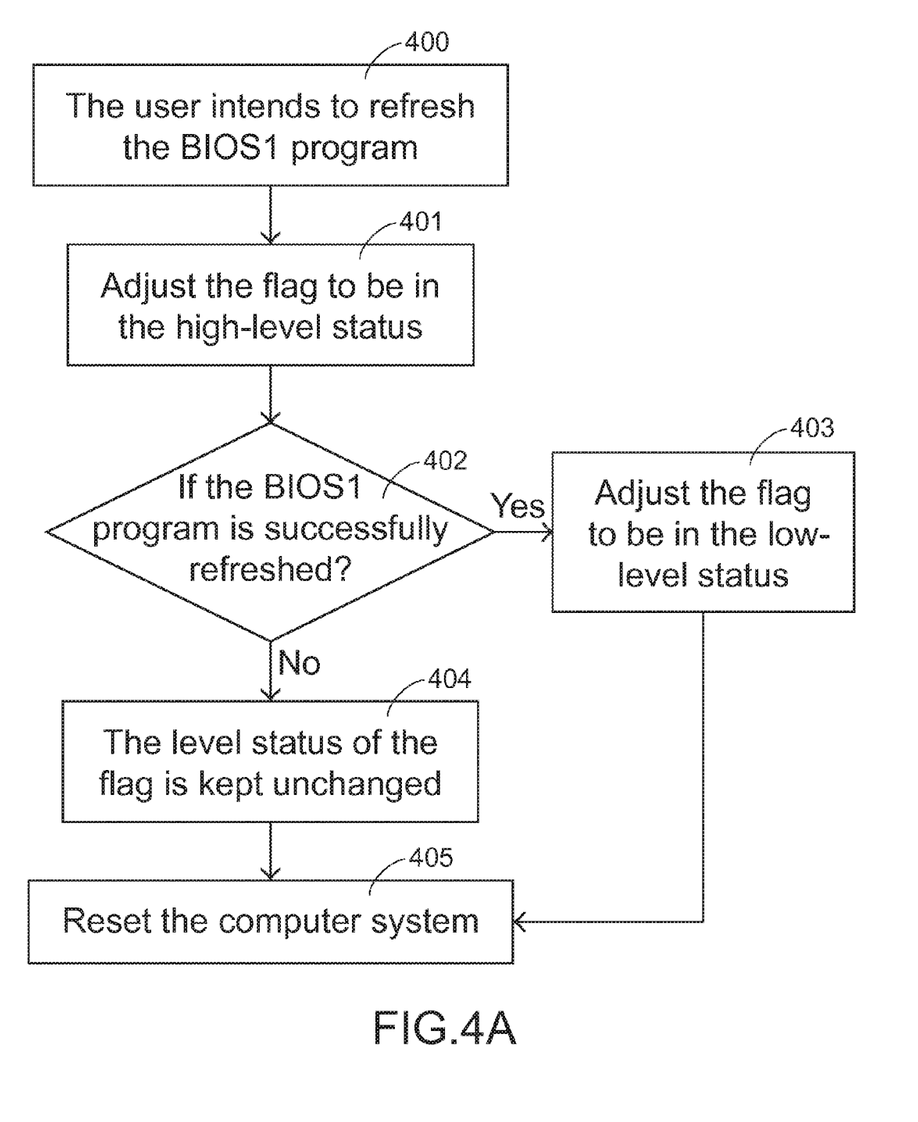
FIG. 4A is a flowchart illustrating the process of refreshing the BIOS program by changing the status of the flag according to the present invention.

FIG. 4A is a flowchart illustrating the process of refreshing the BIOS program by changing the status of the flag according to the present invention. For refreshing the BIOS1 program (Step 400), the flag 309 included in the non-volatile memory 305 is adjusted to be in the high-level status (H) by the input control interface 304 (Step 401). The high-level status (H) of the flag 309 indicates that the BIOS1 program is abnormal and the process of refreshing the BIOS1 program is performed. If the BIOS1 program is successfully refreshed (Step 402), the flag 309 is adjusted to be in the low-level status (L) by the input control interface 304 (Step 403). The low-level status (L) of the flag 309 indicates that the BIOS1 program is successfully refreshed and restored to be normal. If the process of refreshing the BIOS1 program is interrupted or has failure (Step 402), the status of the flag 309 is not changed by the input control interface 304 (Step 404). In other words, the flag 309 is continuously maintained in the high-level status (H).

That is, if the BIOS1 program is successfully refreshed, the flag 309 is adjusted to be in the low-level status (L) again. Whereas, if the BIOS1 program fails to be successfully refreshed, the flag 309 is continuously maintained in the high-level status (H). Regardless whether the BIOS1 program is successfully refreshed or not, the computer system needs to be reset (Step 405).

Figure 4B:
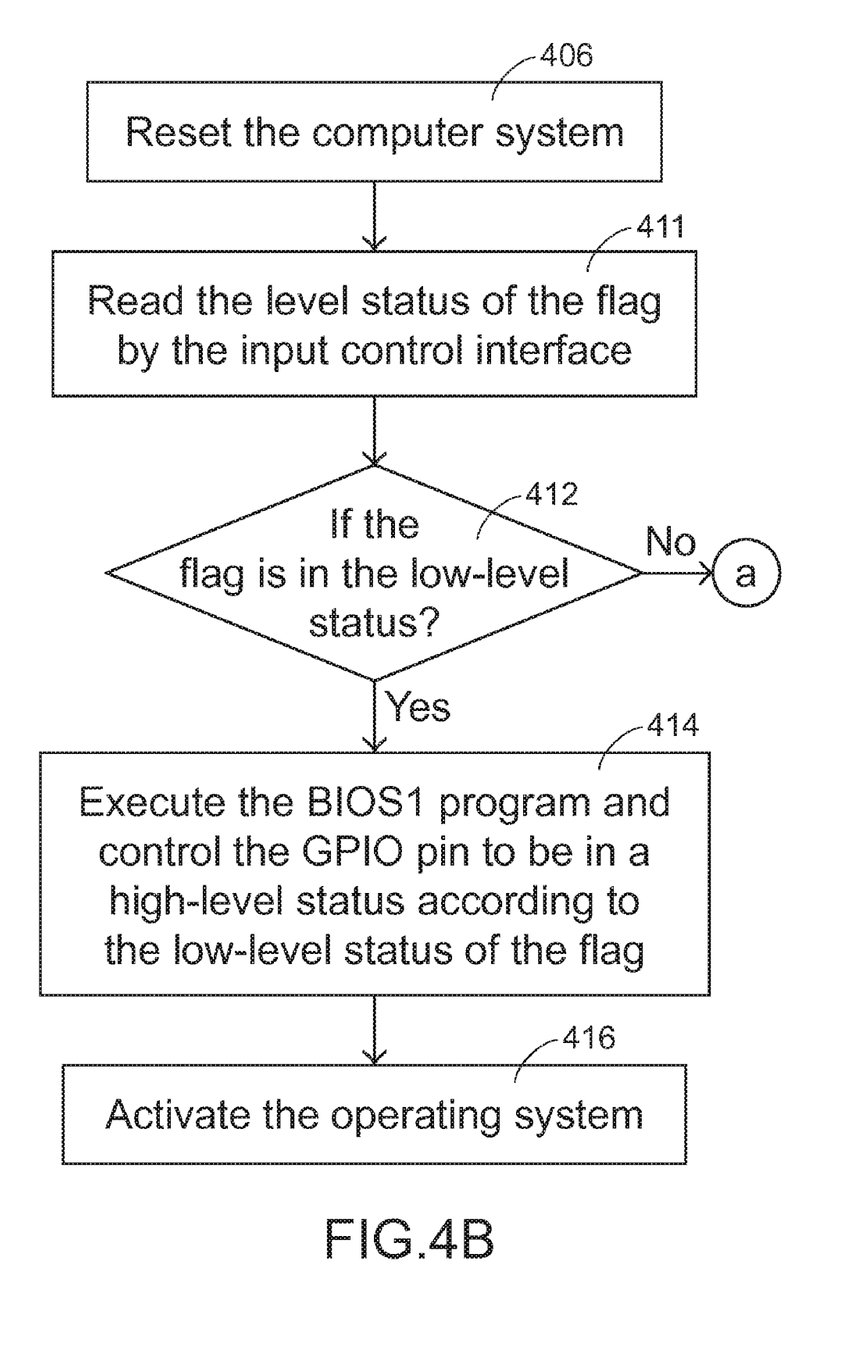
FIGS. 4B and 4C schematically illustrate a flowchart of a process for protecting the BIOS program when the computer system is booted according to the present invention.
Figure 4C:
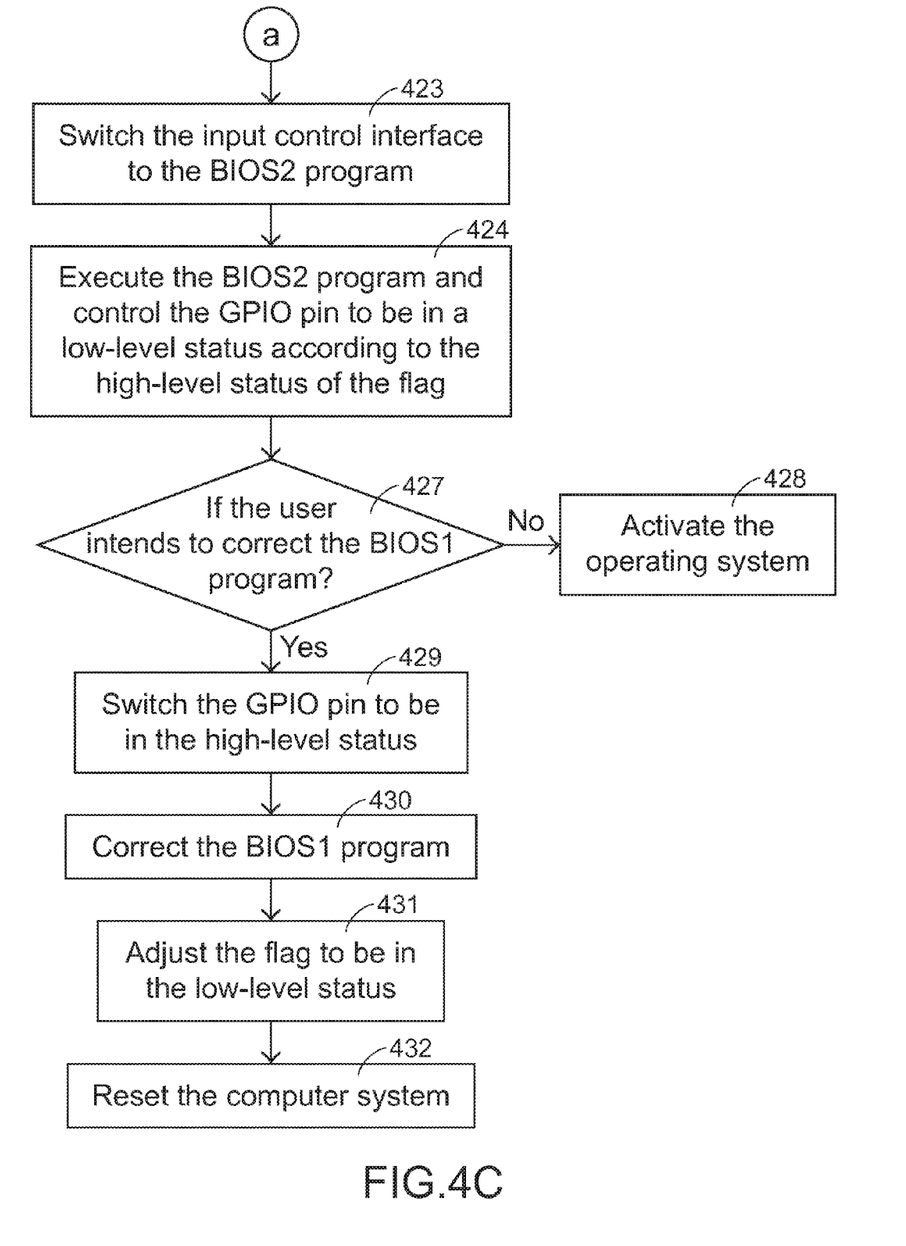

FIGS. 4B and 4C schematically illustrate a flowchart of a process for protecting the BIOS program when the computer system is booted according to the present invention. When the computer system is reset (Step 406), the level status of the flag 309 included in the non-volatile memory 305 is read by the input control interface 304 in order to determine whether the BIOS1 program is normal (Step 411).

If the flag 309 read by the input control interface 304 is in the low-level status (L) (Step 412), it is meant that the BIOS1 program is normal. Next, the CPU 301 executes the BIOS1 program to perform the further booting operations such as the power on self-test (POST). In addition, the CPU 301 will read the status of the flag 309 included in the non-volatile memory 305. According to the low-level status (L) of the flag 309, the CPU 301 controls the GPIO pin to be in a high-level status (H) (Step 414). Meanwhile, the BIOS1 program and the BIOS2 program are maintained in the readable and writable modes. After the execution of the BIOS1 program is implemented, the computer is successfully booted and the operating system is activated (Step 416). Since the control signal GPIO pin is maintained in the high-level status (H) after the operating system is activated, the user could execute the process of refreshing the BIOS program as described in FIG. 4A.

Please refer to FIG. 4C. If the flag 309 read by the input control interface 304 is not in the low-level status (L) but in the high-level status (H) (Step 412), it is meant that the process of refreshing the BIOS1 program has failure and the BIOS1 program is abnormal. For example, the electrical interruption of the computer system during the process of refreshing the BIOS1 program or the inherent problems of the BIOS1 program may cause the failure or abnormal condition. Meanwhile, the input control interface 304 switches to the BIOS2 program (Step 423).

Next, the CPU 301 executes the BIOS2 program to perform the further booting operations such as the power on self-test (POST). In addition, the CPU 301 will read the status of the flag 309 included in the non-volatile memory 305. According to the low-level status (H) of the flag 309, the CPU 301 controls the GPIO pin to be in a low-level status (L) (Step 424). After the GPIO pin is switched to the low-level status (L), the BIOS1 program and the BIOS2 program enters the write protection mode in order to protect the BIOS2 program. In other words, after the operating system is activated, the BIOS2 program fails to be refreshed while maintaining the integrity of the contents of the BIOS2 program.

Moreover, according to the BIOS2 program, the user could realize whether the BIOS1 program is abnormal. For example, after a menu of the BIOS2 program is created on a screen, an erroneous message shown on the screen indicates that the BIOS1 program is damaged. After the user realizes the abnormal condition of the BIOS1 program according to the erroneous message, the user could execute a BIOS correcting program via the menu of the BIOS2 program, thereby correcting the BIOS1 program through the BIOS2 program (Step 427).

Even if the user does not intend to correct the BIOS1 program, the BIOS2 program will be normally executed and the operating system will be activated in order to boot the computer (Step 428). After the operating system is successfully activated, the user fails to refresh the BIOS program under the operating system because the GPIO pin is in a low-level status (L) (that is, the BIOS program enters the write protection mode).

Whereas, if the user intends to correct the BIOS1 program, the CPU 301 controls the GPIO pin to be switched from the low-level status (L) to a high-level status (H) (Step 429). As such, the BIOS program leaves the write protection mode. Next, the procedure of correcting the BIOS1 program is performed (Step 430). In this step, the BIOS1 program is replaced by the BIOS2 program such that the contents of the BIOS1 program and the BIOS2 program are identical. It is of course that the BIOS1 program could be corrected by other means. After the BIOS1 program is corrected, the flag 309 included in the non-volatile memory 305 is adjusted to be in the low-level status (L) by the input control interface 304 (Step 431). It is meant that the BIOS1 program has been restored to be normal at this moment. Afterwards, the computer system is reset (Step 432)

In accordance with the present invention, the user could realize whether the BIOS program is refreshable according to the level status of the GPIO pin. For example, in a case that the GPIO pin is in the high-level status (H), the BIOS program is refreshable. Whereas, in a case that the GPIO pin is in the level-level status (L), the BIOS program is not refreshable.

For refreshing the BIOS program, the flag 309 is adjusted to be in the high-level status (H). After BIOS program is successfully refreshed, the flag 309 is returned to the low-level status (L). Therefore, according to the level status of the flag 309, the CPU 301 could control a corresponding level status of the GPIO pin so as to indicate whether the BIOS program is refreshable or not.

After the flag 309 is adjusted to be in the high-level status (H), the CPU 301 could execute BIOS2 program to boot the computer system. In addition, the user could execute the BIOS correcting program, thereby correcting the BIOS1 program through the BIOS2 program.

From the above description, the computer system and the control method of the computer system are capable of implementing a dual BIOS program protecting function. In a case that one of the two BIOS programs is erroneously refreshed, the other enters a write protection mode. Until the erroneous BIOS program is corrected, the BIOS program leaves the write protection mode. Under this circumstance, even if one of the two BIOS programs is erroneous but has not been refreshed, the other BIOS program fails to be written in order to prevent from an erroneous operation.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A dual BIOS program protecting method for protecting a first BIOS program and a second BIOS program of a computer system, the dual BIOS program protecting method comprising steps of:

switching a flag from a first status to a second status during the refreshing of the first BIOS program;

switching the flag from the second status to the first status if the first BIOS program is successfully refreshed; and generating a first control signal if the flag is in the second status when the computer system is booted, and allowing the second BIOS program to enter a write protection mode according to the first control signal, and the first BIOS program is corrected through the second BIOS program, wherein after the first BIOS program is corrected, the flag is switched from the second status to the first status, a second control signal is issued, and the second BIOS program enters a readable and writable mode from a read only mode according to the second control signal.

2. The dual BIOS program protecting method according to claim 1 wherein the first status is a low-level status and the second status is a high-level status.

3. The dual BIOS program protecting method according to claim 1 wherein the flag is in the first status if no refreshing operation of the first BIOS program is performed.

4. The dual BIOS program protecting method according to claim 1 wherein after the second BIOS program enters the write protection mode, the dual BIOS program protecting method includes a step of correcting the first BIOS program through the second BIOS program.

5. The dual BIOS program protecting method according to claim 1 wherein after the second BIOS program enters the write protection mode, the dual BIOS program protecting method includes a step of displaying an erroneous message associated with the first BIOS program.

6. A computer system having a dual BIOS program protecting function, the computer system comprising:
   a central processing unit;
   a chipset connected with the central processing unit;
   an input control interface connected with the chipset;
   a flag connected with the input control interface;
   a first BIOS external memory connected with the input control interface and an input/output pin of the chipset for storing a first BIOS program; and
   a second BIOS external memory connected with the input control interface and the input/output pin of the chipset for storing a second BIOS program,
   wherein the flag is switched from a first status to a second status during the refreshing of the first BIOS program, wherein if the first BIOS program is successfully refreshed, the flag is switched from the second status to the first status, and if the flag is in the second status when the computer system is booted, a first control signal is generated and the second BIOS program enters a write protection mode according to the first control signal, and the first BIOS program is corrected through the second BIOS program,
   wherein after the first BIOS program is corrected, the flag is switched from the second status to the first status, the input/output pin issues a second control signal, and the second BIOS program enters a readable and writable mode from a read only mode according to the second control signal.

7. The computer system according to claim 6 wherein when the flag is in the first status, the input/output pin issues a second control signal, and the second BIOS program enters a readable and writable mode according to the second control signal.

8. The computer system according to claim 6 wherein the input control interface is an embedded controller.

9. The computer system according to claim 6 wherein the flag is included in a non-volatile memory.

10. The computer system according to claim 9 wherein the non-volatile memory is a flash memory or an electrically erasable programmable read-only memory.

11. The computer system according to claim 6 wherein the first status is a low-level status and the second status is a high-level status.

12. The computer system according to claim 6 wherein after the second BIOS program enters the write protection mode, the second BIOS program is executed to display an erroneous message associated with the first BIOS program.

* * * * *